United States Patent [19]
Gallagher et al.

[11] Patent Number: 6,003,763
[45] Date of Patent: *Dec. 21, 1999

[54] METHOD AND APPARATUS FOR RECORDING MAGNETIC INFORMATION ON TRAVELER'S CHECKS

[75] Inventors: Thomas Gallagher, Belmont; Murdoch Henretty, Half Moon Bay, both of Calif.

[73] Assignee: Visa International Service, Foster City, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,184

[22] Filed: Dec. 29, 1995

[51] Int. Cl.$^6$ ........................................................ G06F 17/60
[52] U.S. Cl. ............................ 235/379; 235/380; 235/493
[58] Field of Search .................................... 235/379, 380, 235/493; 283/58

[56] References Cited

U.S. PATENT DOCUMENTS

| | | |
|---|---|---|
| 3,363,917 | 1/1968 | Gunderson et al. . |
| 3,676,644 | 7/1972 | Vaccaro et al. . |
| 4,092,526 | 5/1978 | Beck . |
| 4,146,664 | 3/1979 | Beck . |
| 4,455,484 | 6/1984 | Whitehead . |
| 4,542,286 | 9/1985 | Golarz . |
| 4,588,211 | 5/1986 | Greene . |
| 4,620,727 | 11/1986 | Stockburger et al. . |
| 4,621,188 | 11/1986 | Stockburger et al. . |
| 4,733,060 | 3/1988 | Dono et al. . |
| 4,758,714 | 7/1988 | Carlson et al. ........................ 235/380 |
| 4,806,740 | 2/1989 | Gold et al. . |
| 4,807,287 | 2/1989 | Tucker et al. . |
| 4,921,279 | 5/1990 | Hanna . |
| 5,016,919 | 5/1991 | Rotondo .................................. 283/58 |
| 5,044,668 | 9/1991 | Wright .................................... 283/58 |
| 5,190,318 | 3/1993 | Mantegazza . |
| 5,288,981 | 2/1994 | Davis ..................................... 235/493 |
| 5,371,798 | 12/1994 | McWhorter . |
| 5,397,623 | 3/1995 | Christy et al. ......................... 235/493 |
| 5,406,068 | 4/1995 | Nusbaum ............................... 235/493 |
| 5,419,588 | 5/1995 | Wood ..................................... 235/493 |
| 5,594,226 | 1/1997 | Steger .................................... 283/58 |

*Primary Examiner*—Harold I. Pitts
*Attorney, Agent, or Firm*—Beyer & Weaver, LLP

[57] ABSTRACT

A method and apparatus for recording magnetic information on traveler's checks. The invention is directed to a method of making it easier to validate traveler's checks and to identify stolen or counterfeit traveler's checks. The method utilizes an information carrying medium, such as a magnetic "stripe," on the surface of, or embedded into, the traveler's check itself. The information carrying medium is encoded with the unique identifying code of the check. Further, a database object corresponding to the unique identifying code is stored along with check status information in a central database. At the time of encashment, the traveler's check is run through a swipe-style reader, and the unique identifying code is sent to a central database for verification. The central database returns an indication to the merchant as to whether the traveler's check is valid.

19 Claims, 10 Drawing Sheets

| b4 | b3 | b2 | b1 | Col. Row | b6 0 b5 0 / 0 | 0 1 / 1 | 1 0 / 2 | 1 1 / 3 |
|---|---|---|---|---|---|---|---|---|
| 0 | 0 | 0 | 0 | 0 | SP | 0 | aa | P |
| 0 | 0 | 0 | 1 | 1 | aa | 1 | A | Q |
| 0 | 0 | 1 | 0 | 2 | aa | 2 | B | R |
| 0 | 0 | 1 | 1 | 3 | cc | 3 | C | S |
| 0 | 1 | 0 | 0 | 4 | $ | 4 | D | T |
| 0 | 1 | 0 | 1 | 5 | SS | 5 | E | U |
| 0 | 1 | 1 | 0 | 6 | aa | 6 | F | V |
| 0 | 1 | 1 | 1 | 7 | aa | 7 | G | W |
| 1 | 0 | 0 | 0 | 8 | ( | 8 | H | X |
| 1 | 0 | 0 | 1 | 9 | ) | 9 | I | Y |
| 1 | 0 | 1 | 0 | 10 | aa | aa | J | Z |
| 1 | 0 | 1 | 1 | 11 | aa | aa | K | bb |
| 1 | 1 | 0 | 0 | 12 | aa | aa | L | bb |
| 1 | 1 | 0 | 1 | 13 | - | aa | M | bb |
| 1 | 1 | 1 | 0 | 14 | . | aa | N | dd |
| 1 | 1 | 1 | 1 | 15 | / | ES | O | aa |

FIGURE 9

| Bits | | | | | Row | Character |
|---|---|---|---|---|---|---|
| $b_p$ | $b_4$ | $b_3$ | $b_2$ | $b_1$ | | |
| 1 | 0 | 0 | 0 | 0 | 0 | 0 |
| 0 | 0 | 0 | 0 | 1 | 1 | 1 |
| 0 | 0 | 0 | 1 | 0 | 2 | 2 |
| 1 | 0 | 0 | 1 | 1 | 3 | 3 |
| 0 | 0 | 1 | 0 | 0 | 4 | 4 |
| 1 | 0 | 1 | 0 | 1 | 5 | 5 |
| 1 | 0 | 1 | 1 | 0 | 6 | 6 |
| 0 | 0 | 1 | 1 | 1 | 7 | 7 |
| 0 | 1 | 0 | 0 | 0 | 8 | 8 |
| 1 | 1 | 0 | 0 | 1 | 9 | 9 |
| 1 | 1 | 0 | 1 | 0 | 10 | aa |
| 0 | 1 | 0 | 1 | 1 | 11 | SS |
| 1 | 1 | 1 | 0 | 0 | 12 | aa |
| 0 | 1 | 1 | 0 | 1 | 13 | dd |
| 0 | 1 | 1 | 1 | 0 | 14 | aa |
| 1 | 1 | 1 | 1 | 1 | 15 | ES |

FIGURE 10

METHOD AND APPARATUS FOR RECORDING MAGNETIC INFORMATION ON TRAVELER'S CHECKS

BACKGROUND OF THE INVENTION

1. Field of the Invention

This invention relates to the field of document fraud prevention, and, particular, to documents equipped with a magnetic stripe.

2. Background Art

Travelers often resort to forms of payment other than personal checks hen traveling far from home. Many merchants do not accept personal checks from out-of-town or out-of-state customers because of the financial risk that the personal check will not be honored, i.e. the check will "bounce." The merchant may request further identification for the transaction, such as a driver's license number, but there is little accountability for a visiting customer. It is in the merchant's best interest to confine accepted forms of payment to forms of payment with a high likelihood of being honored.

Cash documents are a widely honored form of payment. Cash documents, such as currency in the form of printed bills and minted coins, are easily recognizable and readily exchangeable. Because the value of these cash documents is backed by the issuing agency, typically the national government, the merchant has a high degree of confidence in the value of the documents. Further, because the document is so widely recognized, the document is "self-identifying." No additional identifying documents are needed to establish or confirm the value of the document. The value is inherent in the document itself regardless of the bearer. This "self-identifying" nature is much preferred over the nature of personal checks, wherein the value of the check is determined by the unconfirmed value of an individual's account, and is therefore dependent on the bearer's identity. A personal check acts as a promise of a transfer of funds between two specified parties, and thus lacks the generic value of a cash document.

With regard to the interests of the customer/bearer, cash documents in the form of printed or minted currency pose a financial risk. Because the value of the currency resides in the document itself, and not in the bearer, lost or stolen currency is most often unrecoverable. For this reason, traveler's checks are often preferred to currency. A traveler's check is an internationally redeemable draft purchased in various denominations from a bank or traveler's aid company and valid only with the purchaser's endorsement (i.e. countersignature) against his or her original signature on the draft. The signing and countersigning process provides some protection from the fraudulent use of lost or stolen traveler's checks. Further, as a purchasing incentive, the issuing institution often provides for a refund of traveler's checks declared lost or stolen. Therefore, unlike currency, lost or stolen traveler's checks are recoverable for the bearer.

Traveler's checks are generic and self-identifying in nature because they do not require that a specific payee be identified, and the value of the traveler's check is established primarily by the check document itself. After a traveler's check is countersigned, the traveler's check is treated as a cash document. Traveler's checks are treated as cash documents because traveler's checks are backed by an established financial institution with high accountability relative to that for an individual traveler.

FIG. 1 is a flow diagram of how a traveler's check is used. In block 100, a purchaser visits an issuing institution, such as a bank or traveler's aid company, and purchases a traveler's check with a specified value. The purchaser pays for the traveler's check using cash, payment card, or other form of payment. It is not necessary for the purchaser to have an account with the issuing institution because the traveler's check is backed by the institution and not the purchaser. After receiving the traveler's check from the issuing institution, in block 101, the purchaser signs the traveler's check to provide the comparison model for the later countersignature. Barring forgery of the signature, endorsement of the traveler's check to establish the check document as a cash document is limited to the purchaser.

Decision block 102 refers to the time period after the purchaser first signs the traveler's check and prior to presentation of the traveler's check to another party, e.g. a merchant, as a cash document (encashment). If, during the time specified for block 102, the traveler's check is lost or stolen, then, as indicated in block 103, the purchaser informs the issuing institution of the loss or theft, and arranges for reimbursement or replacement. The issuing institution may then structure a list of reported lost and stolen traveler's check serial numbers for identification during check processing after encashment. If, during the time specified for block 102, the traveler's check is not lost or stolen, the traveler's check is presented as a cash document to a merchant or other party in block 105 at encashment, also referred to as a point of sale. Traveler's checks obtained through unlawful means (e.g. lost, stolen or counterfeit traveler's checks) as indicated in block 104 may also be presented as cash documents in block 105.

In block 106, the purchaser countersigns the traveler's check for visual verification by the merchant. If, in block 107, the countersignature does not match the original signature, the merchant refuses the traveler's check in block 108 on the grounds that the person presenting the traveler's check is not the original purchaser of the traveler's check. If, in block 107, the countersignature and original signature are a visual match, in block 109, the merchant accepts the traveler's check as a cash document. The countersigned traveler's check is then submitted to the merchant's bank for processing, and ultimately, to the issuing institution for an exchange of funds.

Problems with traveler's checks include theft, loss and fraud. Each check is signed upon purchase and is countersigned upon use. For the merchant taking the check, as long as the countersignature appears genuine, the check is honored as cash. If the merchant has doubts, the merchant may request some form of personal identification, though this is not the norm. In even rarer cases, the merchant may call the check issuing institution with the serial number of the check to determine if the check has been reported as stolen. Typically, however, the only manner in which the traveler's check is verified at encashment is by visually comparing the original signature and the countersignature. Because of this, the traveler's check industry suffers significant annual losses due to signature forgeries on lost and stolen traveler's checks.

As stated above, in block 103 of FIG. 1, the issuing institution may construct a list of lost and stolen traveler's checks in response to reported loss or theft. However, fraudulent use of these lost or stolen traveler's checks is often not detected until the traveler's check with its forged signature is processed back to the issuing institution and compared with the lost/stolen list, usually at least several days after encashment. Therefore, though the lost/stolen list aids in the discovery of the forgery and later investigation, the list does not necessarily prevent encashment of the traveler's check with the forged countersignature.

In addition to forged signatures, fraudulent transactions in traveler's checks also include the counterfeiting of traveler's checks. Duplicates of issued traveler's checks may be copied using state of the art color-copying methods, or original counterfeit traveler's checks can be printed. If the merchant does not call in the serial number of the counterfeit checks, the checks will be used undetected until presented to the issuing institution.

The traveler's check industry has developed several means for preventing counterfeit traveler's check activity. For instance, watermarks are used in the printing of traveler's checks to differentiate authentic traveler's checks from printed counterfeits. Also, various specialized inks and patterns are used to complicate the printing process beyond the abilities of most counterfeit printing and copying operations. Unfortunately, as copying technology improves, the capabilities of copying counterfeiters also improve. It becomes problematic for the traveler's check issuing institution to stay ahead of counterfeiting technology.

U.S. Pat. No. 5,044,668, granted to Wright, discloses a check checker system wherein a "CC™" check is equipped with a magnetic stripe or bar code along one edge of the document to store the bank number and customer account number. A swipe style reader, or an optical reader in the case of the bar code, reads the data from the stripe or bar code and provides the information to a programmed computer system. The computer system verifies the customer's credit in his account and transfers the funds to the merchant's account at the time of encashment. The account number identifies the customer's account to the programmed computer system, and it is the customer's account status that is queried. Therefore, the customer is required to maintain such an account with the issuing bank to use the "CC™" check. The "CC™" check is thus an internal bank transaction document rather than a cash document. Also, because the customer is issued more than one check with the same account number on it (i.e. the number on the check is not uniquely identifying), it is possible for a counterfeiter to print duplicate checks using the same account number. Such a counterfeit attempt would succeed under Wright if the unsuspecting account holder has sufficient funds in his account. The "CC™" check is therefore susceptible to fraudulent use.

U.S. Pat. No. 5,016,919, granted to Rotondo, discloses a bank check having two magnetic stripes applied to the rear surface. One stripe is placed along a bottom edge of the check away from a front endorsement region, and a second stripe is placed along a side edge away from a rear endorsement region. The magnetic stripes are run through a magnetic character reading device either lengthwise or edgewise. The dual stripes are used to provide redundant information in case of damage to either stripe, and for standard check processing as with MICR (magnetic ink character recognition) data.

U.S. Pat. No. 5,371,798, granted to McWhortor, discloses a system for enhancing detection of counterfeit financial transaction documents. A financial transaction document, such as a check, is provided with a first band of MICR encoded financial information in magnetic ink and a second band of non-magnetic information printed in specific locations either above or below the first band. A magnetic scan sensor is used to read the MICR information and an optical scan sensor is used to read the non-magnetic information. Both MICR and the non-magnetic information are used to differentiate between properly printed documents and improperly printed documents that do not employ this printing technique. McWhortor applies the reading of the two bands during check processing, which occurs after a purchase transaction has taken place.

U.S. Pat. No. 5,190,318, granted to Mantegazza, discloses a document with forgery prevention means. The document, e.g. a check, is provided with an indication-writing portion wherein a forgery may take place, such as where the payee is indicated. The indication-writing portion is provided with regions made of magnetic or magnetizable material spaced by magnetically blank regions, so as to provide a code which can be detected by a magnetic reading head. The magnetic or magnetizable material is erasable by chemical and/or mechanical action, thus providing evidence of tampering if an attempt is made to alter information in that region. Further, the destruction of the magnetic material is detectable by the magnetic reading head as a corruption of the code in that region.

U.S. Pat. No. 4,733,060, granted to Dono et al., discloses a check negotiation system using a check card with a magnetic stripe similar to a bank card. The check card is made out of plastic or hard paper. Characteristic information and the user's account number are stored on the magnetic stripe prior to distribution to the user for purposes of authenticating the check card. A portable check card drawing apparatus is used to write appropriate information, such as the amount of the check, onto the check card. A person receiving a check card may cash it at an ATM having an exclusive check card read-out apparatus. The check card is not a self-identifying cash document. No means are provided for the person receiving a check card to establish whether the check card is fraudulent prior to cashing of the check card at an ATM.

U.S. Pat. No. 3,363,917, granted to Gunderson et al., discloses an apparatus for providing an extended printing region for a document such as a bank check, wherein magnetic ink is used for duplicating an identification code that may have been rendered unreadable on the original check. The apparatus consists of a separate sheet of paper adhesively attached to the back of the check such that a portion of the paper extends beyond the bottom edge of the check. When the check is processed by the bank, the duplicate code on the extended portion of the attached sheet is read by the processing machinery instead of the unreadable code on the original check.

U.S. Pat. No. 3,676,644, granted to Vaccaro et al., discloses a multi-layered document, such as a payment card, having a magnetic stripe on an intermediate layer of the document to protect the magnetic stripe from abuse. To individualize the document, a bar code is imprinted over the concealed magnetic stripe to cause ridges of varying size. An electronic device is then used to detect the different magnitudes of the magnetic fields near the ridges to decode the information stored in the bar code. The magnetic stripe/bar code combination can be substituted with a bar code of magnetic ink printed on an internal layer of the document.

U.S. Pat. Nos. 4,092,526 and 4,146,664, granted to Beck, disclose a payment card having a magnetic stripe overlaying an optical data track. The magnetic stripe is opaque to visible light, but transparent to infrared radiation. A card reader including a magnetic read head and an optical IR read head is used to read both the magnetic and optical data tracks at once. The concealed optical data is then used to verify the authenticity of the card.

U.S. Pat. No. 4,455,484, granted to Whitehead, discloses an identification card with a magnetizable core. Magnetizable pairs located throughout the core are oriented to represent information. Dummy pairs are used to prevent counterfeiting. OCR (optical character recognition) data on the surface of the card is compared with the data from the magnetizable core to verify authenticity.

U.S. Pat. No. 4,542,286, granted to Golarz, discloses a reusable time card carrier with a magnetic stripe. The magnetic stripe contains employee identification, schedule, and time summary information. An imprintable time card is attached for a billing period and then replaced with a new imprintable time card at the beginning of the next billing period.

U.S. Pat. No. 4,588,211, granted to Greene, discloses a machine readable document wherein fluorescent ink is used to highlight data portions of the document for an optical scanner. The highlighted regions are coded according to function using OCR, magnetic ink, or a fluorescent ink omission format, such that a scanning machine may locate a specific field of interest.

U.S. Pat. No. 4,620,727, granted to Stockburger et al., discloses a reusable payment card body whereon adhesive magnetic stripes can be placed. By using removable magnetic stripes, the payment card body can be reused by replacing one magnetic stripe with another.

U.S. Pat. No. 4,621,188, granted to Stockburger et al., discloses a data card and data strip measuring means for providing secured access to a data bank. Only those cards with appropriate authorization are granted access to the data in the data bank.

U.S. Pat. No. 4,806,740, granted to Gold et al., discloses a method for authenticating or identifying an object on the basis of a repeatably sensible, random magnetic medium. A magnetic medium on an object or document is sensed to obtain a magnetic characteristic of the object. The magnetic characteristic is recorded in digital format on a magnetic stripe for comparison with the sensed magnetic characteristic when authentication of the object is desired.

U.S. Pat. No. 4,807,287, granted to Tucker et al., discloses a verification and identifying system similar to Gold et al. However, the system of Tucker et al. employs encryption and error correction.

U.S. Pat. No. 4,921,279, granted to Hanna, discloses a method for printing MICR data on a bank check correction sticker in an offset position such that a deep reader encounters the correction information prior to crossing over the covered erroneous information. The deep reader can therefore lock onto the correct information and tune out the erroneous information as noise.

U.S. Pat. No. 5,406,068, granted to Nusbaum, discloses an authorization card for the purchase of ammunition. The rigid card has ammunition and weapon identification information imprinted upon it, as well as encoded on a magnetic stripe. Purchase of ammunition is permitted only for the specified ammunition type and only if an accessed data bank indicates that the weapon is registered.

SUMMARY OF THE INVENTION

The present invention is a method and apparatus for recording magnetic information on traveler's checks. The invention is directed to a method of making it easier to validate traveler's checks and to identify lost, stolen or counterfeit checks. The method utilizes an information carrying medium, such as a magnetic "stripe," on the surface of, or embedded into, the traveler's check itself. The information carrying medium is encoded with the unique identifying code of the check to permit reading with a swipe reader. Also, a database at a central location maintains a database object corresponding to the unique identifying code of the check.

Many merchants that currently accept traveler's checks also accept payment cards. Correspondingly, these merchants have available to them magnetic swipe readers for use with payment cards. The merchant receiving a traveler's check that contains the information carrying medium swipe the traveler's check through the swipe reader for authentication. The information is forwarded to the central location, and the traveler's check is authenticated based on whether the identifying code is registered as an unused valid check that has not been reported lost or stolen, or similar criteria. The electronic verification of the traveler's check reduces the instances of fraud in the use of traveler's checks without affecting the convenience of use of current traveler's checks.

Further adding to the convenience of traveler's checks, traveler's checks equipped with a magnetic stripe may be dispensed from automatic dispensing machines such as ATM's. The transaction recording function performed by a clerk or teller may be automatically performed in the dispensing process by capturing the information in the magnetic stripe, and utilizing the information to record the transaction electronically. Also, the security provided by the magnetic stripe permits the traveler's check issuer to forego the requirement that a clerk or teller witness the initial signing of the traveler's check, allowing the dispensing process to be automated.

BRIEF DESCRIPTION OF THE DRAWINGS

FIG. 9 illustrates the ISO/IEC standard character set for track one of a magnetic stripe.

FIG. 10 illustrates the ISO/IEC standard character set for track two of a magnetic stripe.

DETAILED DESCRIPTION OF THE INVENTION

Figure 1:
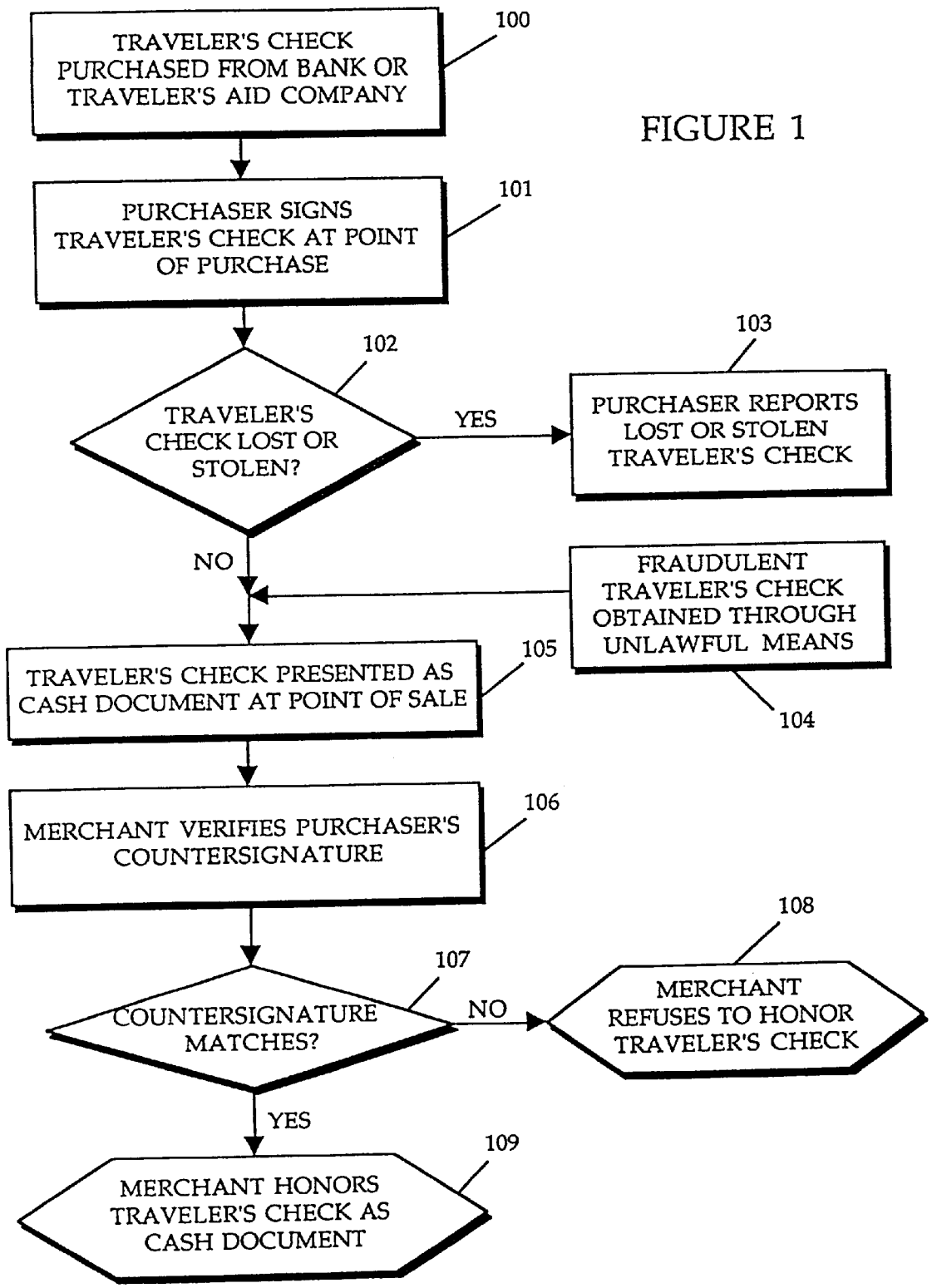
FIG. 1 is a flow diagram of how a standard traveler's check is used.

The present invention is a method and apparatus for recording magnetic information on traveler's checks. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

Traveler's checks are the subject of fraud for much the same reasons that they are valued by the general public. Traveler's checks are accepted by a large number of merchants, and the only identification required to cash a traveler's check is a countersignature approximating the appearance of the original signature. Lost and stolen checks may still be fraudulently cashed even if the original bearer reports to the issuing company that the documents have been stolen. This is because the status of the traveler's check is typically unchallenged until the check is processed through the banking system. Processing may take place several days after the illegal transaction has occurred.

In the same manner, counterfeit traveler's checks are typically not discovered until processed by the issuing company. Therefore, in order to prevent the large financial losses incurred due to fraudulent traveler's check activity, means are required for verifying the authenticity of traveler's checks at the point of encashment, i.e. when a traveler's check is provided to a merchant in lieu of currency at a point of sale.

The present invention provides means for a merchant to verify electronically that a traveler's check is valid. Further, the merchant is able to perform the verification quickly and conveniently using swipe-style readers currently used in the merchant community. The traveler's checks are equipped with a magnetic stripe on the rear face of the check, upon which the unique identifying code of the traveler's check is magnetically encoded. The unique identifying information is thus made electronically accessible.

Further, the status of the traveler's check is reported to a central database center at the time of issuance of the traveler's check to the bearer for later accessing at the time of encashment. If the traveler's check is lost or stolen before encashment, the bearer may report such to the issuing company or directly to the central database center, at which time the database status of the traveler's check is modified to reflect that it has been reported lost or stolen.

At the time of encashment, the merchant visually verifies that the original signature and countersignature are reasonably similar. Also, the merchant swipes the traveler's check through a magnetic swipe reader. The unique identifying information is read from the magnetic stripe and sent to the central database center where the status of the unique identifying code is queried. A positive or negative indication is sent back to the merchant, telling the merchant whether to accept the traveler's check. The merchant is thus able to verify the authenticity and validity of the traveler's check prior to completion of the purchase transaction. Financial losses due to fraudulent use of traveler's checks are thereby reduced.

Figure 5:
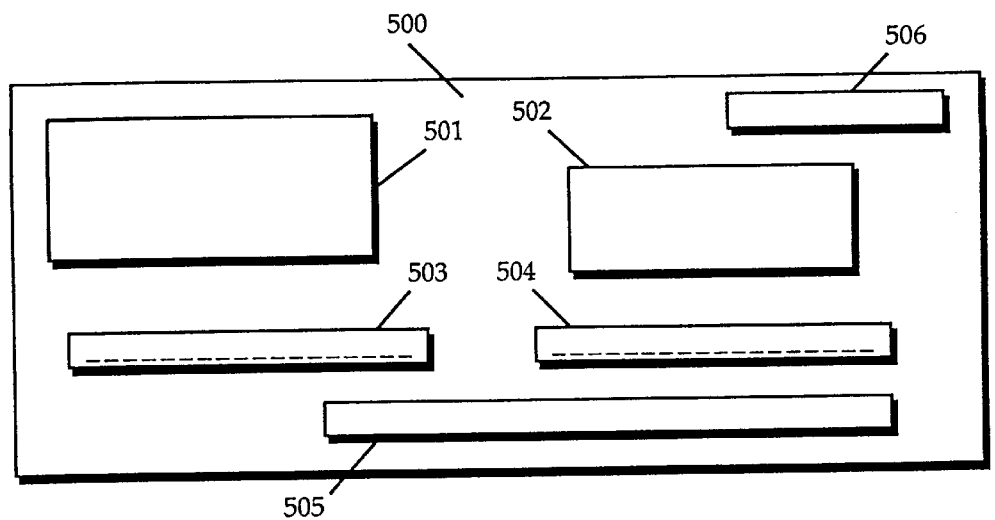
FIG. 5 is an illustration of the front surface of one embodiment of a traveler's check.

FIG. 5 is an illustration of the front face of a traveler's check. The front face (500) of a traveler's check typically includes a region (501) containing printed information about the issuing institution, e.g. the name of the institution, the local address of the issuing institution, etc. Another region (502) contains information indicating the denomination of the traveler's check. Two regions, 503 and 504, are provided for the original signature of the purchaser and the validating countersignature, respectively. Region 506 in the upper right corner typically contains the serial number of the traveler's check along with the routing symbol and ABA (American Bankers Association) number of the issuing institution.

Parallel to the bottom edge of the traveler's check is a region containing MICR data 505 printed in magnetic ink. The MICR data 505 on the front of the traveler's check is both magnetically and optically readable. During standard bank processing of the traveler's check after encashment, the traveler's check is passed in front of an MICR/OCR head for electronic processing of the routing and identifying information encoded in the MICR data. The MICR standard for traveler's checks calls for data to be encoded in a 16 mm (⅝ inch) clear band at the bottom of the check in an MICR format, such as the following VISA traveler's check format for U. S. dollar traveler's checks:

| MICR Position | Contents |
| --- | --- |
| 43 | Transit Symbol |
| 34–42 | 9-Digit Routing and Transit Number |
| 33 | Transit Symbol |
| 30–32 | 3-Digit Currency/Denomination Identifier |
| 26–29 | 4-Digit Issuer Identification Number |
| 25 | Dash |
| 19–24 | 6-Digit Sequential Number |
| 18 | Modulus Check Digit |
| 17 | On-Us Symbol |
| 15–16 | 2-Digit Transaction Code |

The serial number for the traveler's check may be embedded in the MICR format above. For example, in one embodiment, a thirteen-digit serial number comprises the contents of positions 19–24 and 26–32 of the MICR data.

Figure 6:
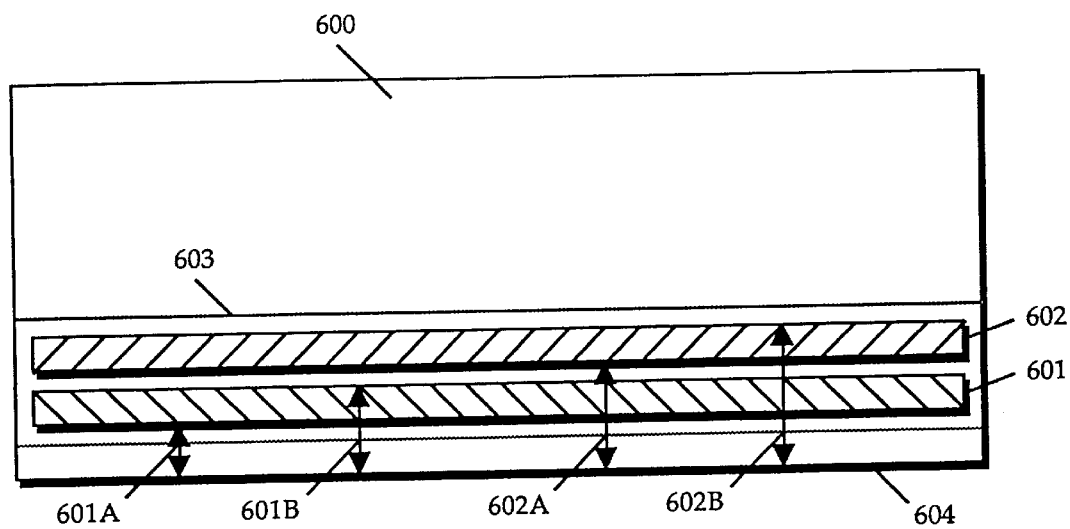
FIG. 6 is an illustration of the rear surface of one embodiment of a traveler's check having a magnetic stripe thereon according to the present invention.

FIG. 6 is an illustration of a rear surface of a traveler's check having a magnetic stripe according to the present invention. Specific details of the embodiment, such as track dimensions and coded character sets, correspond to the international standard established for current payment cards and the associated card swipe readers as provided by the International Standards Organization for (ISO/IEC) 7811 standard under "Physical Characteristics and Test Methods of ID-Cards", and are included for illustration purposes. It will be obvious that other embodiments of the invention that are not designed to use the current standard card swipe readers may differ in their specifications from this standard without departing from the scope of the present invention.

In FIG. 6, magnetic stripe 603 is shown on rear surface 600, parallel to the bottom edge (604). Within stripe 603 are shown two tracks, "track one" (601) and "track two" (602). These tracks are offset from bottom edge 604 by a proscribed standard distance to align with the magnetic read head of the swipe reader. The distance (601A) between the lower edge of track one and bottom edge 604 of the traveler's check should not extend beyond 5.66 mm (0.223 inches). The distance (601B) between the upper edge of track one and bottom edge 604 should be within the range of 8.46 mm to 8.97 mm (0.333–0.353 inches). The distance (602A) between the lower edge of track two and bottom edge 604 should also be within the range of 8.46 mm to 8.97 mm (0.333–0.353 inches). The distance (602B) between the upper edge of track two and bottom edge 604 should be at least 11.76 mm (0.463 inches). The centerline of the first data bit recorded (start sentinel) should be at least 7.94 mm (0.313 inches) from the adjacent side edge of the traveler's check. The centerline of the last data bit recorded (end sentinel) should be at least 6.93 mm (0.273 inches) from the adjacent side edge of the traveler's check.

The dimensions of the magnetic stripe must be sufficient to include the necessary data tracks without significant fringing effects. The standard for a two-track magnetic stripe with respect to payment cards is to allow no more than 2.92 mm (0.115 inches) between the side edge of the document and the leading edge of the magnetic stripe material 603. The lower edge of the magnetic stripe 603 should be maximally 5.54 mm (0.218 inches) from the bottom edge 604 of the document. The upper edge of magnetic stripe 603 should extend at least 11.89 mm (0.468 inches) from the bottom edge 604 of the document.

Because the length of a traveler's check can be as much as or more than twice the length of a standard payment card, it is possible to duplicate the encoded serial data on the magnetic stripe, including duplicate start and end sentinels. This will increase the likelihood of a successful data reading by a swipe reader in the event that the magnetic stripe is damaged in part through means such as folding of the document. In an alternate embodiment, the magnetic stripe is placed parallel to a side edge of the traveler's check. However, due to the shortened dimensions of the magnetic stripe in the alternate embodiment, duplication of the encoded serial data may not be possible.

The magnetic stripe may be rolled onto the traveler's check using heat adhesion or alternatively printed on using magnetic ink. Whereas typical magnetic stripes for payment cards and the like have a coercivity of approximately 300 Oe, higher coercivity ratings, such as 2700 Oe, may be used to allow for thicker application of resistant layers over the top of the magnetic stripe without loss in magnetic readability. The resistant layers protect the magnetic stripe from physical damage that might lessen the integrity of the magnetic stripe. This resistant layer may consist of holographic material or other aesthetically pleasing materials.

In one embodiment of the invention, the magnetic stripe is encoded as part of the traveler's check production process. At one stage in the production process, the MICR check information is printed on the front face of the traveler's check. Frequently, the MICR information is captured by an MICR reader in a later processing stage to verify the traveler's check information for use in sorting the traveler's checks. In the present invention, the capturing stage may be followed by a stage wherein the captured identifying information, e.g., the serial number, is supplied to a magnetic stripe writing device. A standard magnetic transducer (head) is then used to transfer the identifying information into track two of the magnetic stripe. This added step in the production process can be implemented without significantly impinging on the current production process for standard traveler's checks.

Figure 8A:
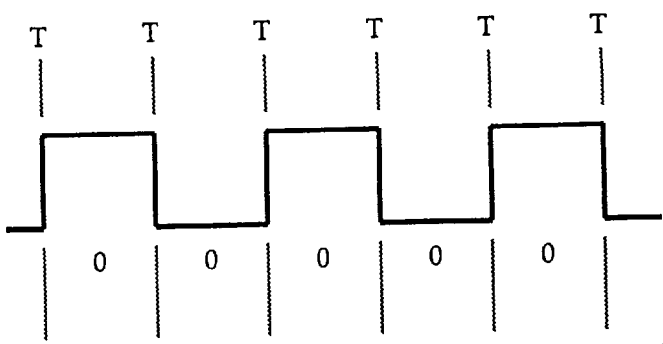
FIGS. 8A–8C illustrate examples of two-frequency encoding.
Figure 8B:
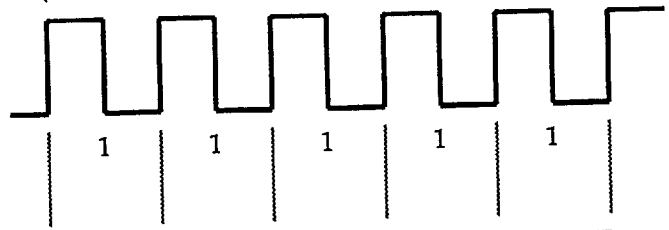
Figure 8C:
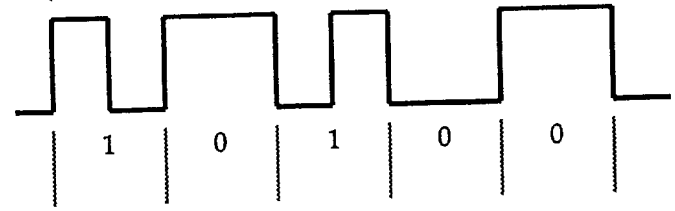

The actual encoding of information into the magnetic stripe is done in a serial format. The standard format uses two-frequency encoding which allows for serial recording of self-clocking data. The encoding comprises data and clocking transitions together. A flux transition occurring between clocks signifies that the bit is a logical "1." An absence of a flux transition between clocks signifies that the bit is a logical "0." Examples of two-frequency encoding are shown in FIGS. 8A–8C. FIG. 8A illustrates a series of 0's wherein the only transitions are clock transitions indicating the self-clocking intervals (designated with "T"). FIG. 8B illustrates a series of 1's wherein each self-clocking interval contains a flux transition. FIG. 8C illustrates encoded representation of the data series "10100." For encoding on the magnetic stripe, the lead-in up to the first data bit (first bit of the start sentinel) is recorded with clocking bits (0's). The bits following the end sentinel data bits are also typically clocking bits.

Tracks one and two of standard ID or payment cards are read differently. Track one contains alphanumeric information to allow for recording of information such as names, etc. that cannot be easily represented with numbers. Track two is reserved for numeric data only. In the preferred embodiment, track two is used to contain the encoded traveler's check identifying information. Though not necessary for the present invention, it is anticipated that track one may be used in certain embodiments to contain further information.

The ISO/IEC standard character set for track one is shown in FIG. 9. Each character is represented by six information bits in the sequence "$b_1 b_2 b_3 b_4 b_5 b_6$." The symbols "SS" (101000) and "ES" (101010) represent the "start sentinel" and "end sentinel" respectively. The symbol "aa" represents characters available for hardware control purposes only and cannot contain information characters. The symbol "bb" represents characters reserved for additional national characters when required. The symbol "cc" represents a character reserved for optional additional graphic symbols. The symbol "dd" represents a separator. The standard for the average bit density of track one is 8.27 bits per millimeter (210 bits per inch)±8%.

The ISO/IEC standard character set for track two is shown in FIG. 10. Each character is represented by four information bits and a parity bit arranged in the sequence "$b_1 b_2 b_3 b_4 b_p$," where $b_p$ is the parity bit. The standard for the average bit density of track two is 2.95 bits per millimeter (75 bits per inch)±5%.

It will be obvious that a third track or more could be used in other embodiments of the present invention. An ISO/IEC standard exists for using a third track in the magnetic stripe. This track three standard is available from the ISO/IEC 7811 and is incorporated herein by reference.

Because the magnetic stripe provides means for preventing fraudulent use of duplicate traveler's checks, it is less important to the issuer of the traveler's check that the document be initially signed in front of a clerk or bank teller. Therefore, automated means may be used to dispense traveler's checks provided with a magnetic stripe and encoded identifying information. Also, traveler's checks have not been dispensed from machines such as ATM's (automated teller machines) in the past due to the requirement for reliable recording of individual traveler's check purchase transactions. The magnetic stripe on the traveler's check provides a means for fulfilling this requirement where none previously existed.

Reading of MICR information requires that the MICR information region be first magnetized, then read by a sensing means. The MICR reading process requires that the document pass extremely close to the MICR reading device with little displacement tolerance. MICR reading devices are therefore not compatible with the compact, high-speed environment of dispensing machines. Documents are likely to be damaged or caught in the MICR reading device, causing malfunctioning and possible shutdown of a dispensing machine. Due to the high volume of service provided by ATM's, shutdown of an ATM machine is highly undesirable.

Unlike in the MICR reading process, a magnetic stripe does not need to be magnetized by the reading device prior to information capture. It is therefore possible to equip a dispensing machine, such as an ATM, with a magnetic stripe reader. As the traveler's check is dispensed, the magnetic stripe passes adjacent to the reading device, and the information encoded in the magnetic stripe is captured. The dispensing machine then records the transaction. Via the captured information, the dispensing machine is also able to verify the denomination of the traveler's check prior to transfer of the traveler's check into the custody of the purchaser.

Further, in response to visual prompting from an electronic display, the purchaser of the traveler's check may provide additional information to the dispensing machine via a keypress I/O device or other user interface, such as those used in ATM's. The information provided by the purchaser, referenced by the captured identifying code, may then be recorded in the central database facility concurrently with the traveler's check status.

Figure 11:
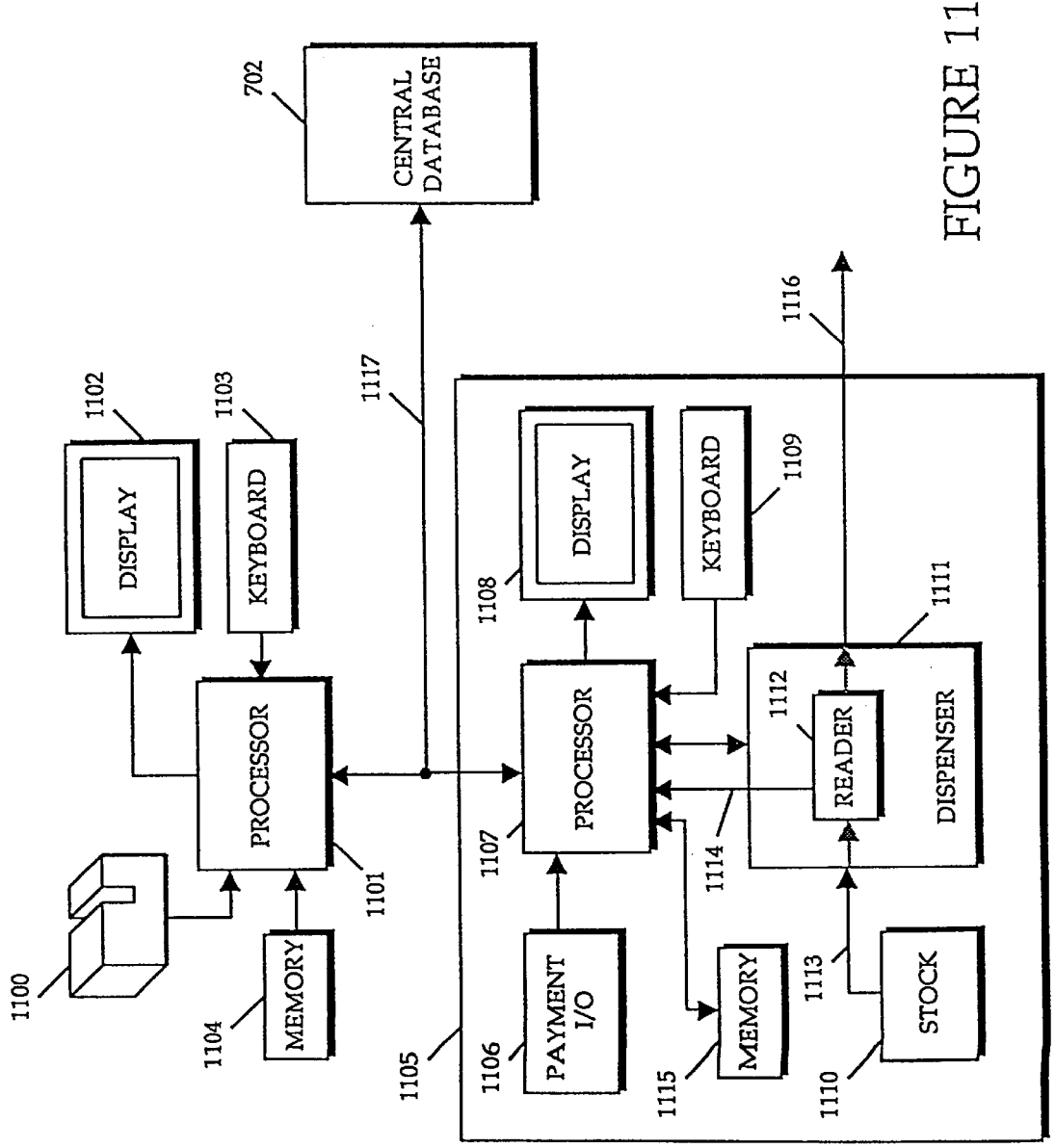
FIG. 11 is a block diagram of dispensing means for traveler's checks equipped with a magnetic stripe.

FIG. 11 is a dispensing arrangement showing means for teller-assisted dispensing and automated dispensing of traveler's checks. For the teller-assisted dispensing of traveler's checks, means comprising blocks 1100–1104 are used to record the traveler's check purchasing transact on, and to transmit the status information to the central database facility 702. The automated dispensing means comprise elements 1105–1116. Communication line 1117 may be any suitable communication medium, such as a standard telephone line, fiber optics, coaxial cable, cellular link, etc.

Swipe reader 1100 is coupled to processor 1101 to provide the digital information captured from the magnetic strip of the traveler's check. The teller or clerk dispensing the traveler's check slides the traveler's check through the swipe reader when required by a recording process running in processor 1101. Memory 1104 provides storage, preferably RAM, for the processes running in processor 1101, and may also be used to store recorded traveler's check information for the dispensing location.

The teller interacts with the recording process running in processor 1101 via keyboard 1103 and display 1102. Visual prompting and feedback are provided to the teller or clerk over display 1102 (e.g. CRT monitor, LCD screen, or the like). The teller or clerk provides input to processor 1101 by depressing keys on keyboard 1103 or other similar input device. Information provided to processor 1101 may include identifying information about the purchaser and/or other transaction recording information kept by the dispensing institution.

A communication process running in processor 1101 interfaces with a communication process in central database facility 702 to transmit the traveler's check identification code and status information via communication line 1117 to central database facility 702. As a result, status information in the central database indicates that the recorded traveler's check is currently valid. Appropriate communication hardware, such as a modem or the like, is coupled to processor 1101 to facilitate the data transfer from processor 1101 to central database facility 702. Further description of central database facility 702 is provided in the description with respect to FIG. 7.

In FIG. 11, automated dispensing machine 1105 is coupled to central database facility 702 via communication line 1117 for the purpose of updating status information for purchased traveler's checks. In one embodiment, the dispensing machine communicates with the central database facility each time a traveler's check is purchased, such that status information in the central database is updated substantially instantaneously.

In other embodiments, the dispensing machine may communicate with the central database facility at specified intervals to update status information for traveler's checks purchased within the intervals. For updating at intervals, traveler's check purchase recording information is stored in memory 1115 within dispensing machine 1105 over the interval period, and used to provide status update information to the central database at the next scheduled communication operation.

Dispensing machine 1105 comprises processor 1107 coupled to communication line 1117. Like processor 1101, processor 1107 is coupled to appropriate communication hardware for facilitating communication between dispensing machine 1105 and central database facility 702. Memory 1115 is used as storage for communication, recording, and control processes running in processor 1107.

A purchaser of a traveler's check interfaces with dispensing machine 1105 via display 1108, keyboard 1109, and payment I/O device 1106. The purchased traveler's check is received from a mechanical output device (1116), e.g., a compartment with a mechanically-controlled sliding door, an egress slot, etc. Prompts are placed on display 1108 according to the recording process running in processor 1107. The purchaser responds to the display prompts by entering information via an input device such as keyboard 1109. Payment I/O device 1106 comprises swipe readers, optical scanners or the like for receiving and processing payments made by payment card, cash, etc. Similar to many present ATM's, the insertion of a payment card into payment I/O device 1106 may be used to initiate a purchase process in the dispensing machine.

Dispensing machine 1105 contains a stock (1110) of unpurchased traveler's checks. The status of each of these unpurchased traveler's checks is either recorded as "unpurchased" or simply not included in central database facility 702 prior to their purchase. Dispenser 1111 comprises mechanical means 1113 for removing an unpurchased traveler's check from stock 1110, passing the unpurchased traveler's check through magnetic reader device 1112, and transferring the traveler's check to output device 1116. Dispenser 1111 is responsive to control signals from processor 1107, prompted by the control process running therein.

Reader 1112 captures the magnetically stored information from the traveler's check as it passes through. The captured information is then provided as a digital signal (1114) to processor 1107. The processor may use the information provided by reader 1112 to determine if the traveler's check is of the correct denomination before the traveler's check is passed to output device 1116. The traveler's check identifying code may be used to transmit status information to central database facility 702 during the purchasing process, or the traveler's check information may be stored in memory 1115 to be sent, along with stored information from other traveler's checks, at specified intervals.

Figure 2:
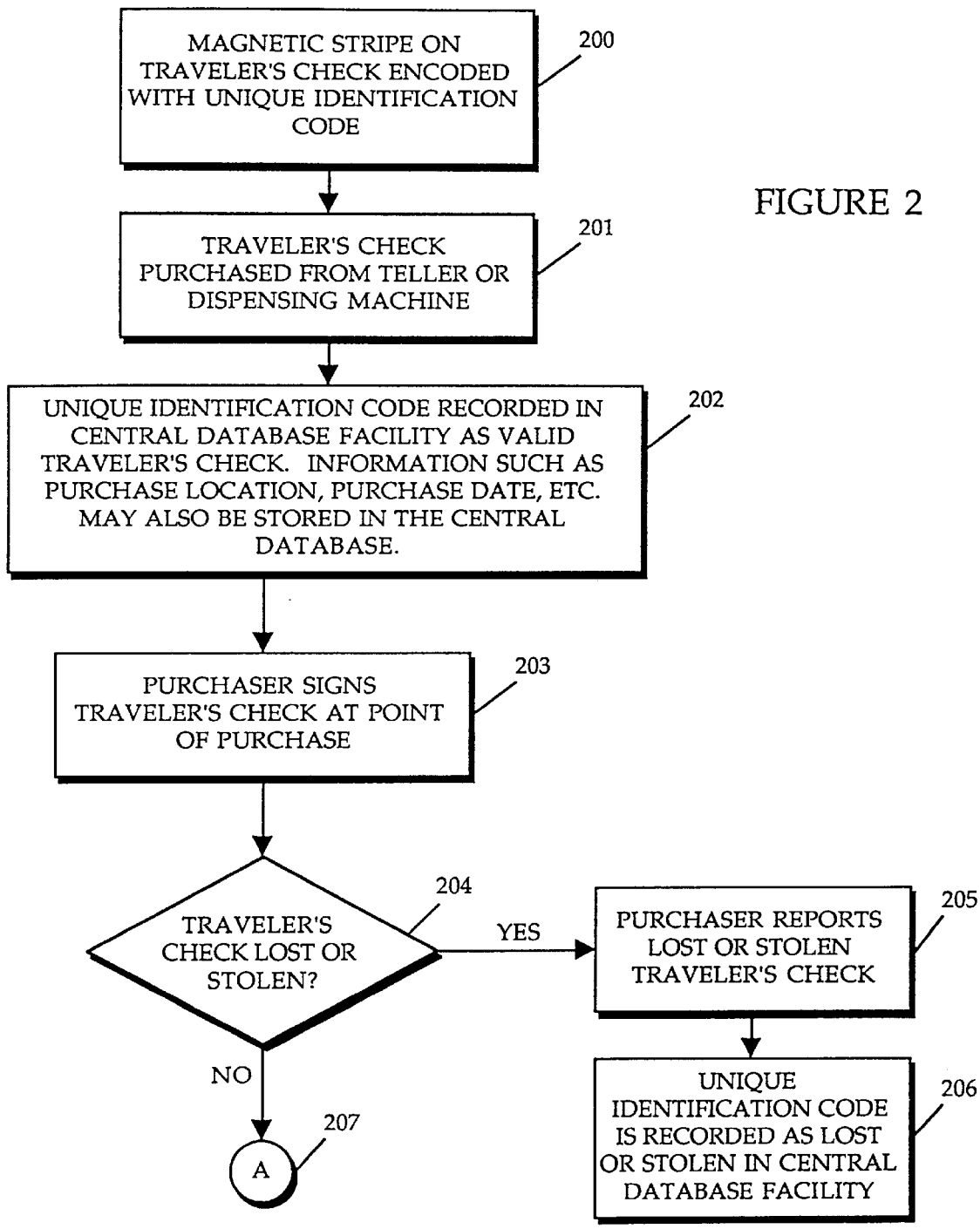
FIG. 2 is a flow diagram illustrating one embodiment of the traveler's check issuing process of the present invention.

FIG. 2 is a flow diagram illustrating the process through which the traveler's check of the present invention proceeds from encoding of the magnetic stripe through purchase of the traveler's check. In block 200, the magnetic stripe on the rear face of the traveler's check is encoded with the unique identification code. As stated above, this step may be done during the production process of the traveler's check in conjunction with the capturing of the MICR data on the front face of the traveler's check.

In block 201, The traveler's check is purchased from a clerk at an issuing institution such as a bank or from an automatic dispensing machine. The manner by which the purchaser pays for the traveler's check may be in the form of cash, payment card, etc. In any case, it is not necessary for the purchaser to maintain an account at the issuing institution because the traveler's check is paid for up front by the purchaser, after which the traveler's check is backed by the issuing institution itself.

In block 202, at the time the traveler's checks are being dispensed, the clerk or machine dispensing the traveler's check records the valid status of the traveler's check, referenced by the unique identification code, in the central database facility. This may be accomplished by reading the magnetic stripe with a swipe reader and updating the status information in the central database facility electronically or by other suitable means.

It will be obvious to one skilled in the art that information other than a valid status indication may be updated in the central database facility referenced by the unique identification code, e.g. the purchase location, the date of purchase, purchaser's name, etc. In another embodiment, further information may be encoded into track one or track three of the magnetic stripe prior to transfer of the traveler's check into the custody of the purchaser.

The central database facility may be a part of the issuing institution or it may be a third party facility offering such database verification services to one or more issuing institutions. The database facility is equipped with a computer system having a processing unit and memory for database storage and retrieval functions. Communications hardware and software are available to allow the database facility to interact with remote locations through such transmission means as telephone lines and the like.

In block 203 of FIG. 2, the purchaser places his signature on the traveler's check, preferably immediately after receipt. It is this signature that will be used as the basis for comparison of the countersignature by the merchant at the time of encashment.

Decision block 204 branches based upon whether the purchaser of the traveler's check loses the traveler's check or has the traveler's check stolen prior to encashment. If the traveler's check is lost or stolen from the purchaser, in block 205, the purchaser reports the loss or theft to the issuing institution. In subsequent block 206, the central database facility is updated to reflect that the traveler's check referenced by the unique identification code is listed as lost or as stolen.

Figure 3:
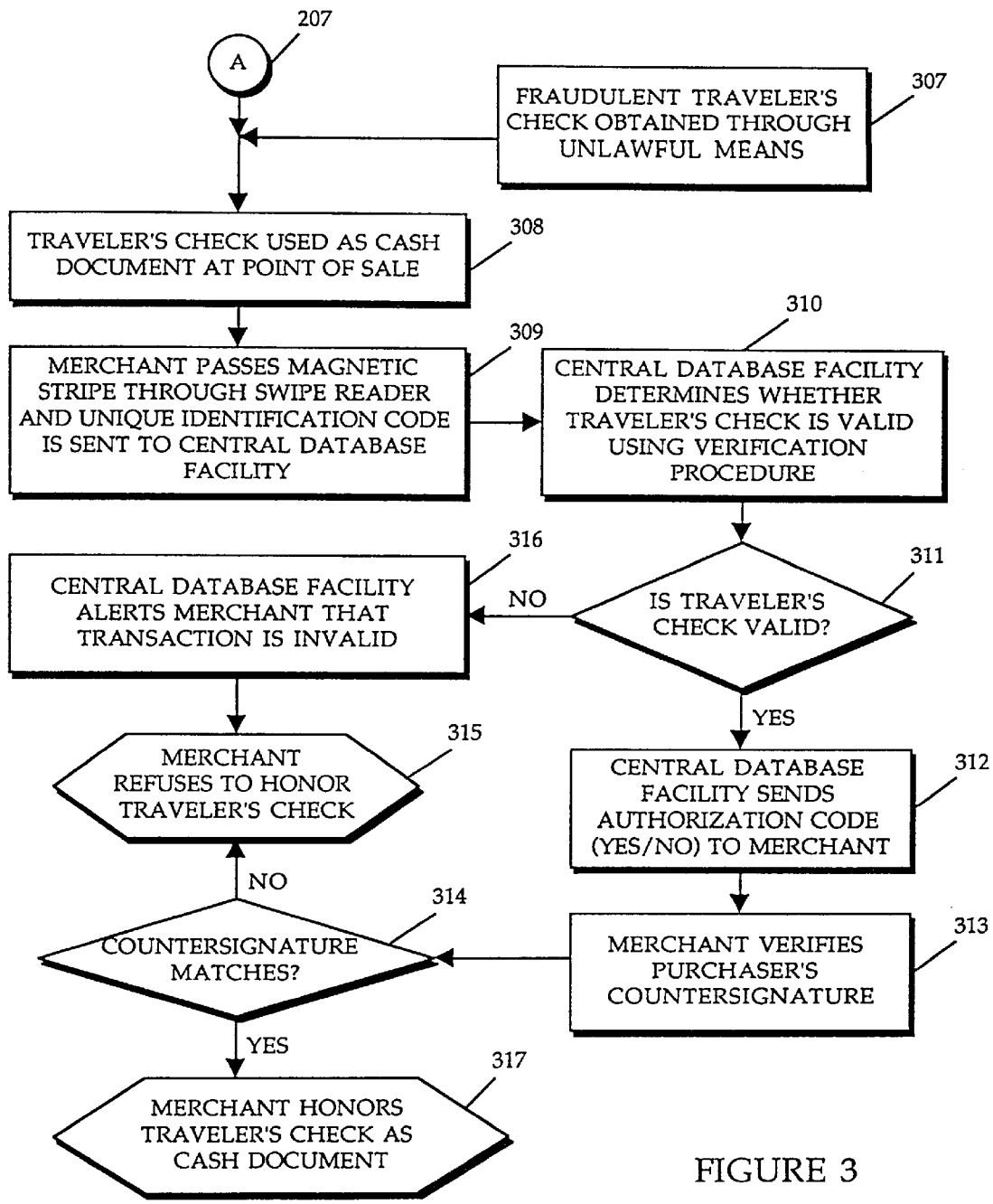
FIG. 3 is a flow diagram illustrating one embodiment of the encashment process of the present invention.

In decision block 204, if the traveler's check is not lost or stolen, then the process continues to block 207 ("A"), which also represents the first block of the encashment flow diagram of FIG. 3.

FIG. 3 is a flow diagram of the encashment process for the traveler's check of the present invention. In the encashment process, the traveler's check presented to the merchant may either be a legitimate traveler's check presented by the purchaser as represented by block 207, labelled as "A," or it may be a fraudulent traveler's check obtained through unlawful means as represented by block 307. These fraudulent traveler's checks include lost or stolen traveler's checks presented by someone other than the purchaser, and duplicate or counterfeit traveler's checks as earlier described.

In block 308, the legitimate or fraudulent traveler's check is presented to the merchant as a cash document at the point of sale (encashment). In subsequent block 309, the merchant passes the traveler's check through a swipe reader device prepared specifically for such a purpose or through a swipe reader device such as is typically used for payment card transactions. The swipe reader device reads the encoded data from the magnetic stripe on the rear face of the traveler's check and transmits the unique identification code to the central database facility for verification.

In block 310, the central database facility accesses the status of the traveler's check referenced with the unique identification code, and determines whether the traveler's check is valid using a verification procedure. Decision block 311 represents the decision in the central database facility as to whether the traveler's check is valid.

If the traveler's check is not valid, then, in block 316, the central database facility transmits an indication to the swipe reader device that the traveler's check is invalid. This indication may be as simple as a "yes/no" indicator, or as complex as a verification code indicating why the traveler's check is invalid. The merchant is able to read the invalid indicator from the swipe reader device, and, in block 315, the merchant refuses to honor the traveler's check as a cash document. In this manner, fraudulent use of duplicate or counterfeit traveler's checks, or those reported lost or stolen, is prevented.

If, in block 311, the traveler's check is valid based on the central database facility's verification procedure, then, in block 312, the central database facility transmits an indication to the swipe reader device that the traveler's check is valid. After the merchant reads the indicator from the swipe reader, in block 313, the merchant has the bearer of the traveler's check countersign the document in his presence. Decision block 314 represents the determination by the merchant of whether the countersignature matches the original signature. If the countersignature does not match the original signature on the traveler's check, then, in block 315, the merchant refuses to honor the traveler's check as a cash document. If the countersignature and original signature match, then, in block 317, the merchant accepts the traveler's check as a valid cash document.

Figure 7:
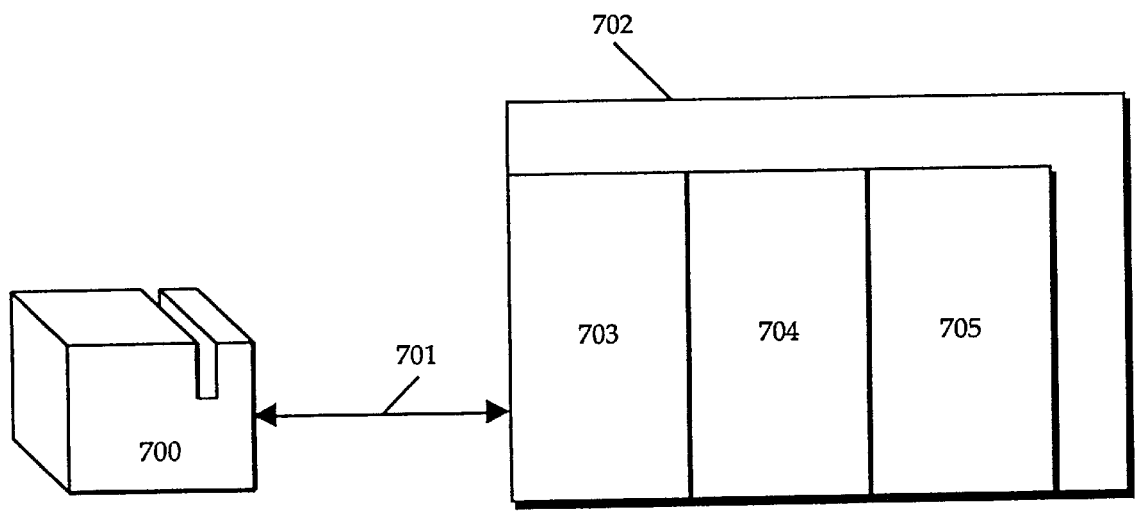
FIG. 7 is a symbolic block diagram of a swipe reader device linked via a communication line with a database facility for one embodiment of the present invention.

A symbolic block diagram illustrating the swipe reader device linked to the central database facility is shown in FIG. 7. A swipe reader device 700, such as those used for payment card transactions, is located at the point of sale/encashment for use by the merchant. A slot is provided on one surface of swipe reader 700. This slot is equipped with a magnetic read head positioned on the inner surface of the slot for reading the encoded information in a magnetic stripe of a traveler's check passed through the slot. In the preferred embodiment, the read head is aligned to read "track two" of the magnetic stripe, though further reading means may be provided to read information on "track one" and/or "track three" in alternate embodiments.

Swipe reader 700 is also provided with communication hardware to interface with the central database facility (702) via communication path 701. Communication path 701 may comprise standard telephone line, coaxial cable, a cellular link, etc., or a combination of such. The information transmitted by swipe reader 700 is received by communication hardware and software 703 at database facility 702. Communication means 703 provide the received information, including the unique identification code, to processing means 704 for use in the verification process.

Communication means 703 receive the authorization/rejection code from the processing means and transmit the information over communication path 701 to the communications hardware in swipe reader 700. The merchant is able to ascertain the authorization/rejection information from a visual display on swipe reader 700. The visual display may be as simple as LED (light emitting diode) yes/no indicators or as complex as an LCD (liquid crystal display) or CRT display showing alphanumeric authorization/rejection information.

Processing means 704 in database facility 702 may comprise a standard processor such as is used in personal computers or workstations known in the art, or it may comprise a processor that is specifically designed for database functions. In the preferred embodiment, the verification process consists of a software process run by processing means 704. In alternate embodiments, the verification process may be provided by hardware or firmware, such as a process stored in ROM (read only memory). The software process accesses the information in database storage 705, which may comprise a hard disk array or other suitable storage media.

Figure 4:
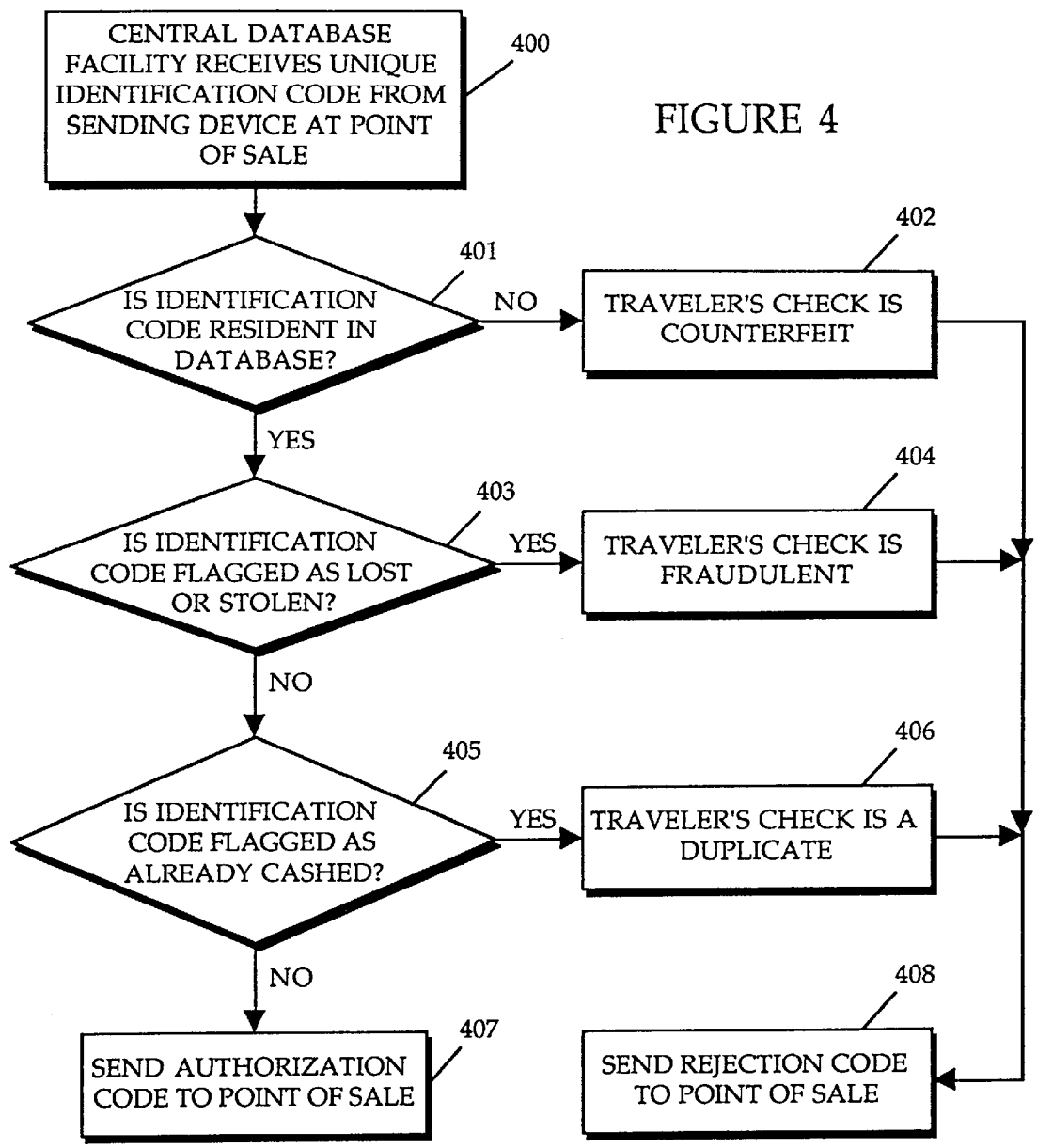
FIG. 4 is a flow diagram of one embodiment of the verification process of the present invention.

FIG. 4 is a flow diagram of one embodiment of the verification procedure of the present invention. These operations correspond to blocks 310 and 311 of FIG. 3. In block 400, the central database facility receives the unique identification code transmitted from the swipe reader device at the point of sale. A software process running in the processing means at the database facility performs a database search for the traveler's check information indexed by the unique identification code.

The first verification decision is shown in block 401, where, if the identification code is not found in the database, the traveler's check is designated as counterfeit in block 402. If the identification code is present in the database, the verification procedure progresses to decision block 403.

In block 403, the software process determines whether the identification code is flagged as belonging to a lost or stolen traveler's check. If the identification code is so flagged, then the traveler's check is designated as fraudulent in block 404. If the identification code is not so flagged, then the verification procedure progresses to block 405.

In block 405, the software process determines whether the identification code is flagged as already cashed. If the identification code is so flagged, then the traveler's check is designated as a duplicate check in block 406. If the identification code is not so flagged, then, in block 407, the central database facility transmits an authorization code back to the swipe reader device at the point of sale. The authorization code may be as simple as a "yes" indicator.

If the traveler's check has been designated as a counterfeit, fraudulent or duplicate traveler's check in blocks 402, 404 or 406, then, in block 408, the database facility transmits a rejection code to the swipe reader device at the point of sale. The rejection code may be as simple as a "no" indicator, or it may include an indication of why the traveler's check is rejected. In some embodiments, the rejection code may signal the merchant to take some further action, e.g. to immediately report the attempted transaction to a law enforcement agency, etc.

It will be obvious to one skilled in the art that the verification procedure of FIG. 4 may, in alternate embodiments, reorder or combine the verification decision blocks, or provide additional verification blocks without departing from the scope of the invention.

Implementing the method and apparatus described above, issuing institutions in the traveler's check industry can reduce financial losses due to traveler's check fraud. By storing traveler's check status in a central database referenced by the unique identifying code of the traveler's check, and using a magnetic stripe to facilitate convenient interaction with the central database, fraud prevention is accomplished with minimal impact on the current traveler's check production methods, while maintaining maximum convenience for users of traveler's checks.

Thus, a method and apparatus for recording magnetic information on traveler's checks has been described.

We claim:

1. A method for preventing fraudulent use of a cash document of the type having a first face with a first region for containing a signature, a second region for containing a countersignature, and a third region containing a denomination value, said method comprising the steps of:

encoding a unique identifying code in a magnetic stripe prior to issuance of said cash document, said magnetic stripe positioned on a face of said cash document and parallel to one edge of said cash document;

recording in a database at a central location said unique identifying code and a status code indicating a status at issuance of said cash document to a bearer;

altering said status code of said cash document in said database if the status of said cash document changes prior to encashment;

swiping said cash document through a swipe reader at a point of encashment, said swipe reader having means to read said unique identifying code encoded in said magnetic stripe;

transmitting said unique identifying code to said central location;

based on said transmitted unique identifying code, determining from said database said status of said cash document;

transmitting a status indication from said central location to said point of encashment;

receiving said status indication at said point of encashment; and processing said cash document dependent on said status indication.

2. The method of claim 1 wherein said cash document comprises a traveler's check.

3. The method of claim 2 wherein said unique identifying code comprises a traveler's check serial number.

4. The method of claim 1 wherein said step of encoding said unique identifying code in said magnetic stripe comprises the steps of:

capturing said unique identifying code from an MICR strip on one face of said cash document;

encoding said captured unique identifying code into said magnetic stripe.

5. The method of claim 1 wherein said step of determining said status of said cash document comprises the steps of:

determining said cash document is being fraudulently used if said transmitted unique identifying code is not resident in said database;

determining said cash document is being fraudulently used if said status code in said database has been altered in said altering step;

determining said cash document is being fraudulently used if said status code indicates that said cash document was previously cashed;

presenting said status indication to reflect that said cash document is invalid if said cash document is being fraudulently used as determined from said database.

6. The method of claim 1 further comprising the step of verifying a countersignature on said cash document at said point of encashment.

7. An apparatus for preventing fraudulent use of a cash document, comprising:

said cash document having a front face and a rear face;
wherein said front face comprises a first region for containing a signature, a second region for containing a countersignature, and a third region containing a denomination value;
wherein said rear face comprises a magnetic information carrying medium bearing encoded information, said encoded information comprising a unique identifying code for said cash document;

a central database having a database object referenced by said unique identifying code, said database object including status information uniquely associated with said cash document;

a swipe reader coupled to said central database, said swipe reader having means for reading said encoded information from said information carrying medium and for transmitting and receiving information with said central database, said swipe reader transmitting at least said unique identifying code to said central database, wherein said central database uses said unique identifying code to identify a status of said cash document, said central database causing said at least said status code to be sent to said swipe reader, and said swipe reader receiving at least said status code from said central database; and an indicator, responsive to said status code received from said central database, for indicating an attempted fraudulent use of said cash document.

8. The apparatus of claim 7 wherein said cash document is a traveler's check.

9. The apparatus of claim 7 wherein said central database comprises communication means for interfacing with said reader.

10. The apparatus of claim 7 wherein said central database comprises processing means and memory.

11. The apparatus of claim 10 wherein said database object resides in said memory, and wherein said processing means has a resident verification process accessing said database.

12. The apparatus of claim 7 wherein said central database is at a location remote from said reader.

13. The apparatus of claim 12 wherein said reader is coupled to said central database via a communication line comprising a telephone line.

14. The apparatus of claim 7 wherein said front face further comprises a fourth region containing document identification information as MICR data.

15. The apparatus of claim 14 wherein said encoded information comprises said document identification information.

16. The apparatus of claim 7 further comprising an automated dispensing device having a second reader for capturing said encoded information when said cash document is dispensed, said second reader coupled to said central database, and said second reader having means for reading said encoded information from said information carrying medium and for interacting with said central database.

17. The apparatus of claim 16 wherein said dispenser verifies a denomination of said cash document based on captured encoded information.

18. The apparatus of claim 16 wherein said dispenser further comprises a user interface wherein purchaser information is received, said purchaser information being recorded with said unique identifying code in said central database.

19. A method for purchasing goods or services using a cash document of the type having a first face with a first region for containing a signature, a second region for containing a countersignature, and a third region containing a denomination value, said method comprising:

(a) presenting said cash document at a point of purchase, said cash document having a magnetic stripe including a unique identifying code that uniquely identifies said cash document said point of purchase having a magnetic stripe reading device coupled to a processor, said processor selectively coupled to transmit and receive information from a central database;

(b) swiping said cash document through said magnetic stripe reader;

(c) transmitting said unique identifying code read from said magnetic stripe to said central database;

(d) determining if said unique identifying code is resident in said central database;

(e) checking a status code associated with said unique identifying code; and if said status code indicates that said cash document has not been reported as stolen or previously cashed, transmitting an authorization code to said point of purchase.

* * * * *